Figure 1:
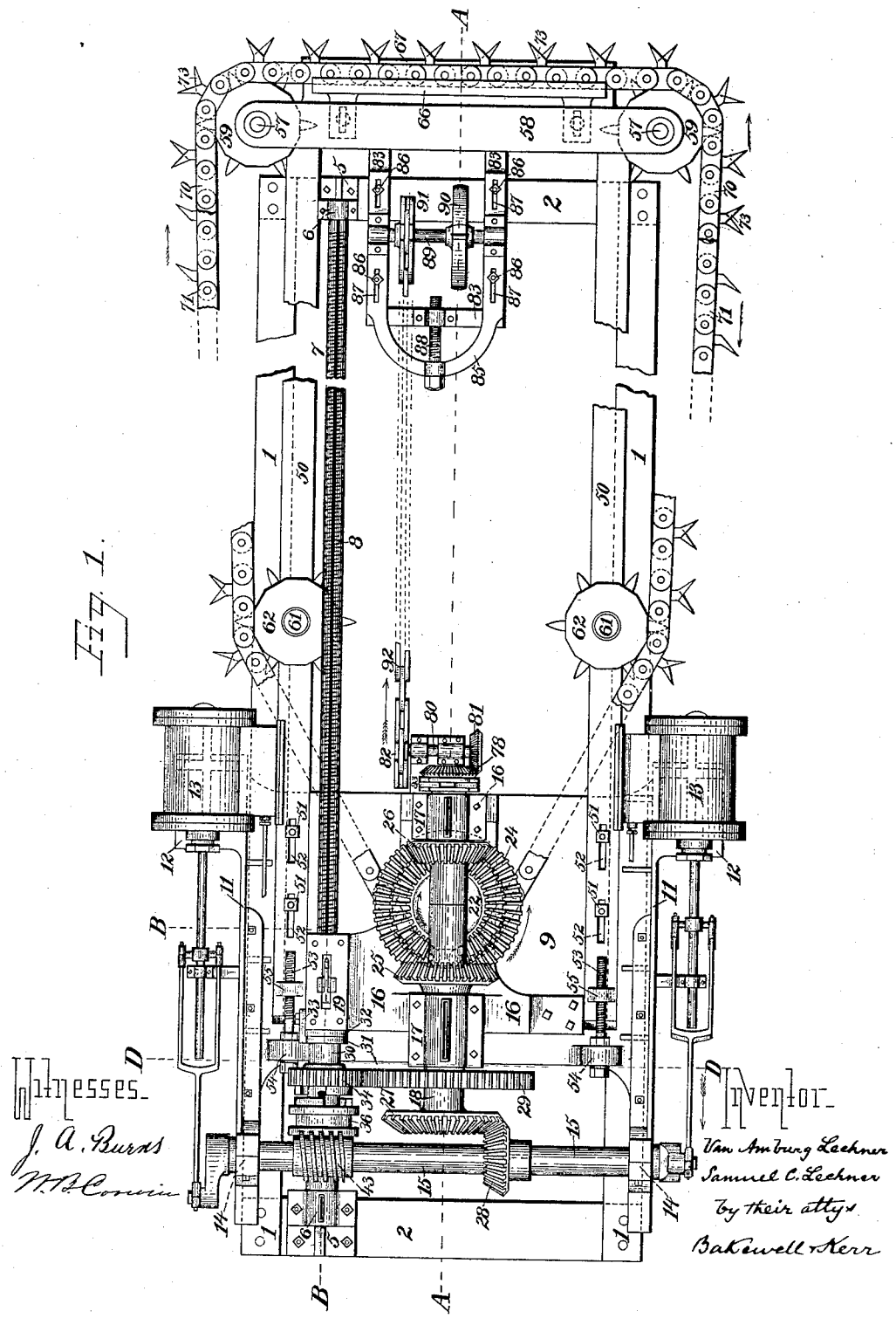

(No Model.) 5 Sheets—Sheet 1.

VAN AMBURG LECHNER & S. C. LECHNER.
COAL MINING MACHINE.

No. 340,791. Patented Apr. 27, 1886.

Witnesses
J. A. Burns
N. B. Corwin

Inventor
Van Amburg Lechner
Samuel C. Lechner
by their attys
Bakewell & Kerr (No Model.) 5 Sheets—Sheet 2.
VAN AMBURG LECHNER & S. C. LECHNER.
COAL MINING MACHINE.

No. 340,791. Patented Apr. 27, 1886.

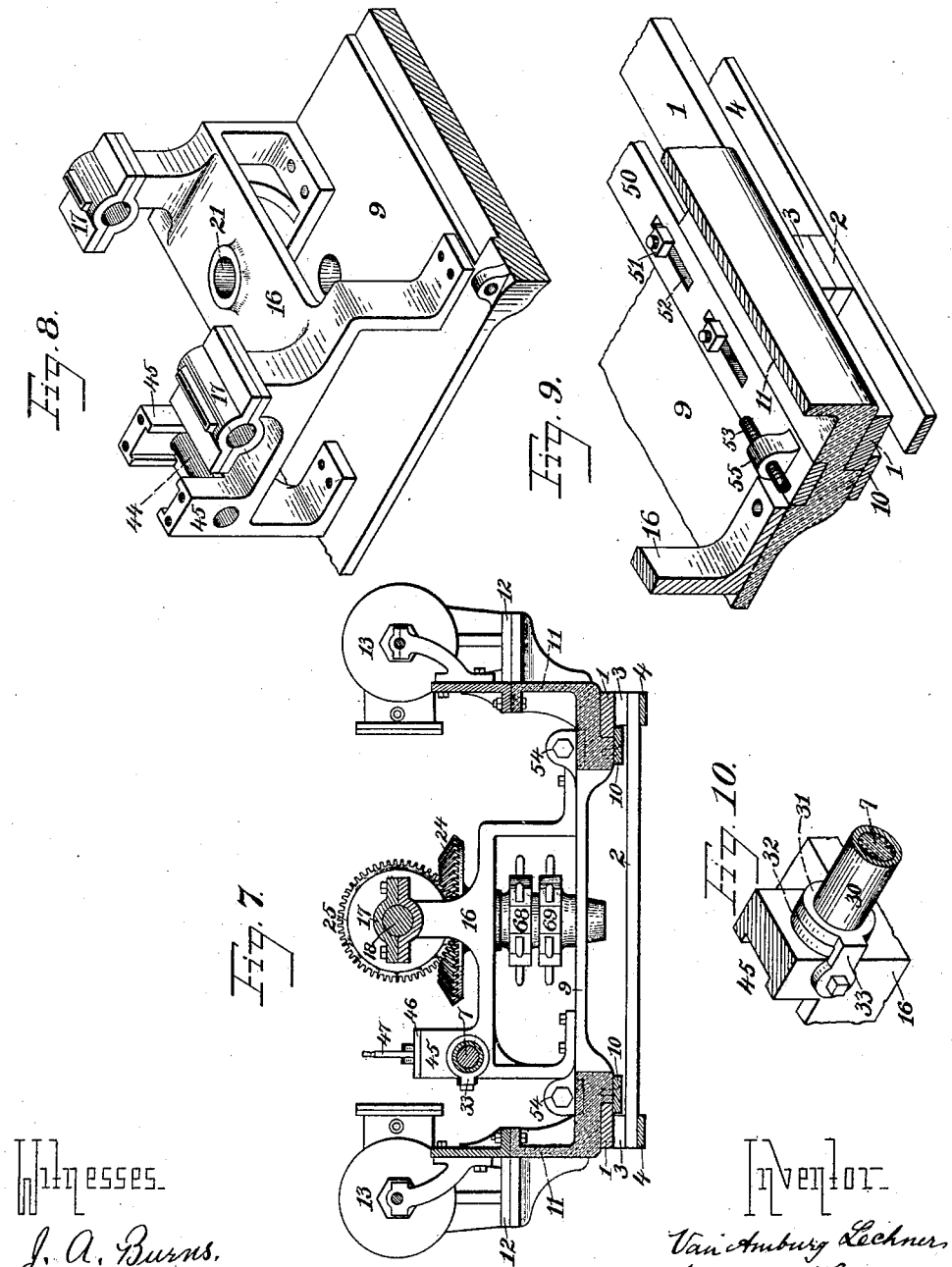

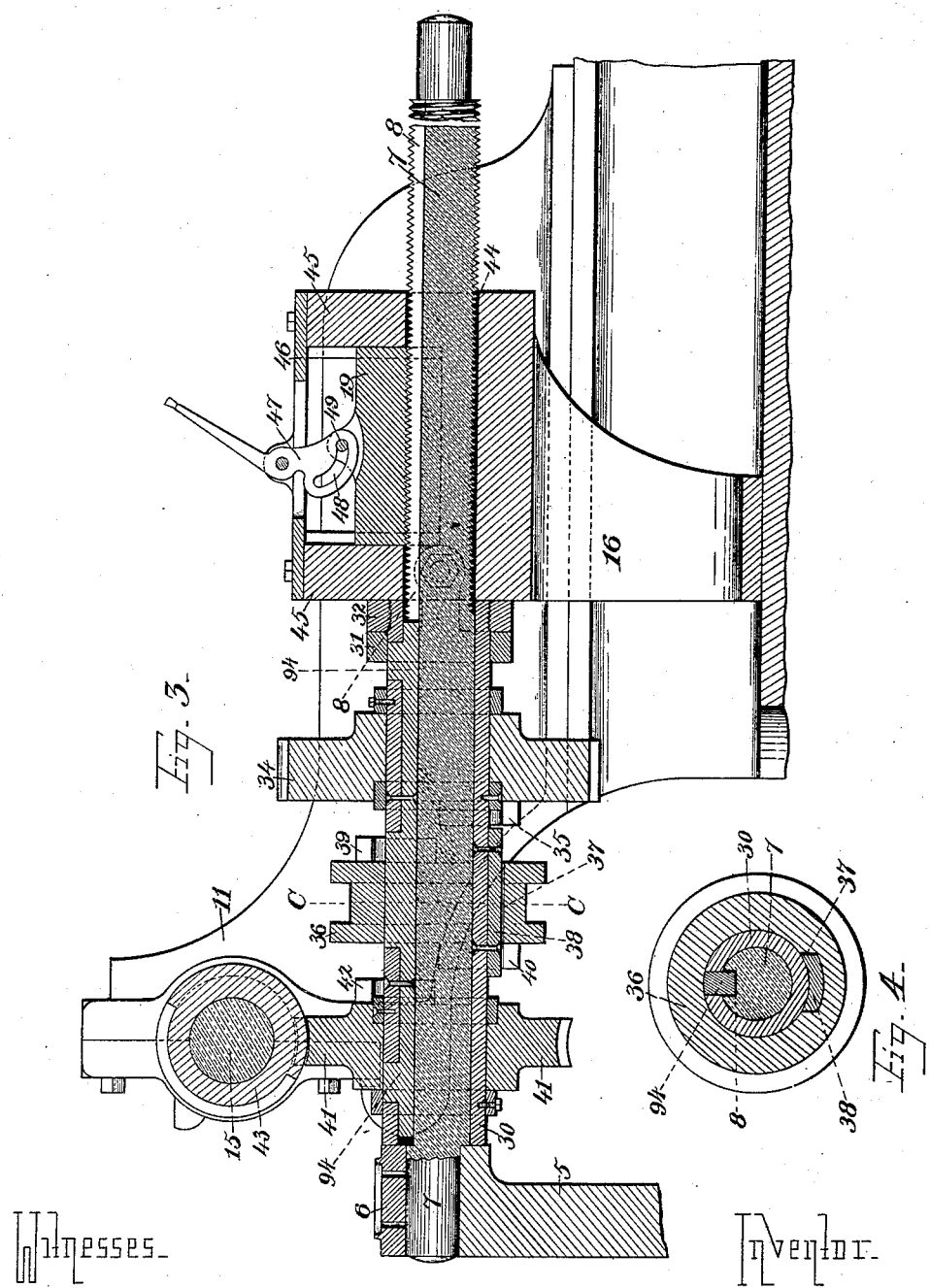

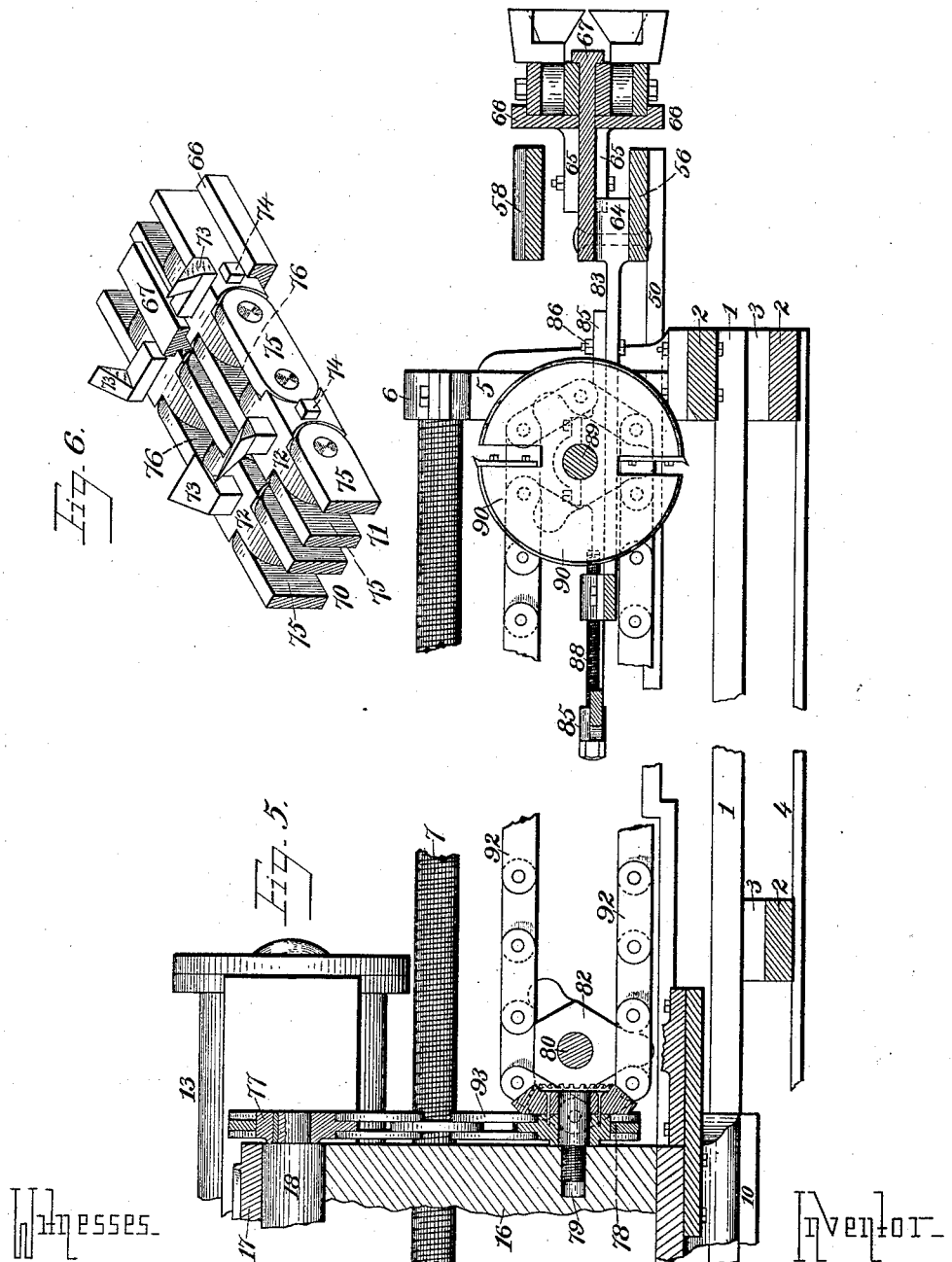

UNITED STATES PATENT OFFICE.

VAN AMBURG LECHNER AND SAMUEL C. LECHNER, OF COLUMBUS, OHIO, ASSIGNORS OF TWO-THIRDS TO FRANCIS M. LECHNER, OF SAME PLACE.

COAL-MINING MACHINE.

SPECIFICATION forming part of Letters Patent No. 340,791, dated April 27, 1886.

Application filed June 8, 1885. Serial No. 167,957. (No model.)

*To all whom it may concern:*

Be it known that we, VAN AMBURG LECHNER and SAMUEL C. LECHNER, of Columbus, in the county of Franklin and State of Ohio, have invented a new and useful Improvement in Coal-Mining Machines; and we do hereby declare the following to be a full, clear, and exact description thereof.

Our invention consists in improvements on that class of machines for mining coal and similar substances which is provided with a stationary frame, a moving frame carrying one or more cutter-chains, which are driven by sprocket-wheels, and a suitable air or steam engine. These machines usually have a screw-shaft operating in connection with a suitable nut connected with the moving frame for the purpose of giving the moving frame a reverse motion, said frame being fed forward by other means. In our machine the forward motion which is necessary to feed the cutters against the breast of rock is obtained by means of the screw-shaft, as well as the reverse motion, which is necessary to withdraw the cutters from the rock.

Another characteristic feature of our improved machine is that the actuating-engines are mounted on the moving carriage.

To enable others skilled in the art to make and use our improvement, we will now describe it by reference to the accompanying drawings, in which—

Figure 1 is a plan view of the machine. Fig. 2 is a section on the line A A of Fig. 1. Fig. 3 is a section on the line B B of Fig. 1. Fig. 4 is a section on the line C C of Fig. 3. Fig. 5 is an enlarged view of a portion of Fig. 2. Fig. 6 is a perspective view of the cutter-chains at the guide-plates at the front end of the cutter-frame. Fig. 7 is a cross-section on the line D D of Fig. 1, looking in the direction of the arrow. Fig. 8 is a perspective view of the frame or housing which supports the shafts on the moving carriage. Figs. 9 and 10 are details.

Like figures of reference indicate like parts.

The stationary frame of the machine is composed of longitudinal bars 1, which are connected at the ends and about the middle by cross-bars 2. Interposed between the bars 1 and 2 are blocks 3, of less width than the bars 1, and extending along the sides under the bars 1 are longitudinal tie-bars 4, which are fastened to the under sides of the blocks 3. At one side of the frame thus formed, one at each end, are standards 5, provided at their upper ends with journal-boxes 6 for the screw-shaft 7. The screw-shaft is provided with a longitudinal spline or groove, 8. All the other parts of the machine are supported by the sliding frame or carriage and move with it. The sliding carriage 9 rests on the bars 1, which constitute the ways upon which it slides. It is provided with flanges 10, which are bolted or otherwise secured thereto. These flanges extend under the inner edges of the ways 1 and prevent the displacement of the carriage. At the edges of the carriage 9 are vertical standards 11, which support the bed-plates 12 of the engine-cylinders 13 and the bearings 14 of the driving or crank shaft 15. The shaft 15 is provided with a crank at each end, said cranks quartering with each other in the usual manner. On the sliding carriage 9 is a frame or housing, 16, which supports the journal boxes or bearings 17 of a short shaft, 18, which drives the cutter-chains. The housing 16 also supports the nut 19, with which the screw 7 engages to give the forward and back motions to the sliding carriage. Stepped in the carriage 9 is a vertical shaft, 20, which extends up through the hole 21, Fig. 8, in the horizontal plate of the frame 16. On the upper end of the shaft 20 is a beveled gear-wheel, 22, Fig. 2. Stepped on the shoulders on the shaft 20, and surrounding the same, is a hollow shaft, 23, which also extends up through the hole 21, and is provided with a beveled gear-wheel, 24, at its upper end, which wheel is larger in diameter than the wheel 22, which stands immediately above it. On the horizontal shaft 18, between the boxes 17, are two beveled gear-wheels, 25 and 26, which engage, respectively, at opposite points the beveled gear-wheels 24 and 22. On the rear end of the horizontal shaft 18 is a beveled gear-wheel, 27, and mounted on said shaft, between the beveled gear-wheel 27 and the rear pillow-block, 17, is a large gear-wheel, 29. Power is communicated to the shaft 18 from the crank-shaft 15 by means of a beveled pinion, 28, mounted on the latter, which engages with the beveled gear-wheel 27 on the former. The pinions 22, 24, 27, 28, and 29 are keyed to their respective shafts so as to revolve therewith.

Referring now particularly to Figs. 1, 3, and 10, on the screw-shaft 7 is a sliding tube, 30, which is connected to the housing 16, so as to slide along the shaft 7 therewith, in the following manner: On the end of the tube 30 is a loose collar, 31, which is secured by means of a nut or collar, 32, screwed on the end of the tube. The loose collar 31 is provided with a strap, 33, which is bolted to the side of the frame 16, as shown in Fig. 10. Being thus connected, the tube 30 moves back and forth with the carriage 9. Mounted loosely on the tube 30 is a gear-wheel, 34, provided with a clutch, 35, on its rear face. Still farther back on the tube 30 is a sliding clutch, 36, having a key-seat, 37, in which extends a feather or spline, 38, secured or formed on the outside of the tube 30. The tube 30 is provided with a feather, 94, on the inside, which extends into the key seat or groove 8 of the screw 7, so that when power is communicated to the clutch 36 the tube 30 and the screw-shaft 7 will be caused to revolve therewith. The clutch 36 is provided with clutch-teeth 39 and 40 on opposite sides. Back of the sliding clutch 36 is a worm-wheel, 41, which is secured loosely to the tube 30, which wheel has a clutch, 42, on the side next to the sliding clutch 36. The worm-gear 41 is actuated by means of a worm-wheel, 43, mounted on the crank-shaft 15. The gear-wheel 29 on the shaft 18 engages with the gear-wheel 34 on the tube 30. The wheels 34 and 41 turn loosely on the tube 30 until the clutch 36 is thrown into gear with one or the other. In such case the tube 30 and the screw-shaft 7 are caused to rotate in the desired direction, depending upon which wheel—34 or 41—the clutch 36 is engaged with. The wheels 34 and 41 are revolved in opposite directions by means of their driving-wheels 29 and 43.

Arranged in line with the screw-shaft 7, at one side of the frame 16, (see Fig. 8,) is a concave trough or bed, 44, at the ends of which are vertical standards or guides 45, in which the semicircular nut 19 works. The screw-shaft 7 passes through the standards 45 and lies in the trough or bed 44. A slotted plate, 46, Fig. 3, is bolted to the upper ends of the standards 45, and supports a cam-lever, 47, which is provided with an eccentric slot, 48. The nut 19 has a pin or wrist, 49, supported by suitable lugs on its upper side, which pin extends through the eccentric slot 48 of the lever 47. The nut 19 can be raised or lowered, so as to be disconnected from or connected with the screw-shaft 7, by means of the levers 47, as will be understood.

Secured to the sliding carriage 9, in suitable grooves, one at each side, are longitudinal bars 50, which are connected at the front ends by means of a cross-bar, 56, Figs. 2 and 5. The bars 50 are made adjustable in their grooves for the purpose of tensioning the cutter-chains, as will be described, by means of the slots 52, through which their securing-bolts 51 extend, and by means of the screws 53, which extend through lugs 54 on the carriage 9 and through lugs 55 on the bars 50. This is done by loosening the bolts 51 and turning the screws 53 until the desired tension is obtained, when the bolts 51 can be tightened up and the frame secured in its adjusted position. At the outer ends of the cross-bar 56 are vertical shafts 57, the upper ends of which are connected by a cross-brace, 58. On each of these shafts 57 are two chain sprocket-wheels, 59 and 60, which turn loosely on their shafts. On the bars 50, at a point near to the carriage 9, are similar shafts, 61, on each of which are mounted two chain sprocket-wheels, 62 and 63, which turn loosely on said shafts. Bolted to the cross-bar 56 are two blocks, 64, which support the plate 67, having a double flange or T-shaped outer edge. Adjustably secured to the upper or lower side of the plate 67, by stems 65, are vertical guide-plates 66, each having a horizontal flange along their outer edges. The guide-plates 66 and 67 extend across the front of the machine nearly the entire distance between the sprocket-wheels 59 and 60. The purpose of these flanged plates 66 and 67 is to guide the cutter-chains in their passage across the front of the machine when they are working on the breast of the coal. The plates 66 hold the cutters up to their work and prevent them moving out sidewise, and the flanges of the plate 67 guide them in their course across the front.

A difficulty has heretofore been experienced in the use of this class of machines, which was occasioned by one of the cutters encountering a hard piece in the breast of rock, causing the chain to buckle and jam between the end plate and the rock. The machine in such case was exposed to danger of breakage, and it was necessary in many instances to stop the engines and pry out the chain. By the arrangement of guide-plates shown and described no such occurrence can take place, as it is impossible for the links to buckle on each other, they being held in the straight line of their travel by the flanged guide-plates.

On the vertical shaft 23 is a sprocket-wheel, 68, and on the shaft 20 is a sprocket-wheel, 69. These shafts, as before stated, are revolved in opposite directions. They constitute the driving-shafts by which the cutter-chains are driven. These chains 70 and 71 are driven in opposite directions. Their cutters incline in the direction of their movement, and when operating on the breast of coal or other substance work against each other in parallel lines, so that the resistance of the coal on the one is exerted against that on the other, and as the line of cut is at right angles to the advance of the machine the back-pressure on the machine is reduced to a minimum. The chains are composed of cutter-block 72 having cutters 73 inserted therein and secured by screws 74. The cutter-blocks 72 are connected together by two links, forming openings 76 between them, with which the teeth of the sprocket-wheels engage.

On the forward end of the shaft 18 is a sprocket-wheel, 77, and mounted on a shaft, 79, directly below the wheel 77, is a combined sprocket and beveled pinion-wheel, 78. The beveled portion of this wheel gears into the beveled pinion 81, mounted on the short cross-shaft 80, which is journaled on the carriage 9, and is provided at its other end with a sprocket-wheel, 82. Secured to the cross-bar 56, at the front end of the machine, is a frame, 83, such frame being bolted to the bar 66 by means of its end block, 64, before referred to. Mounted on the frame 83 is a sliding yoke, 85, which is adjustably secured thereto by bolts 86 passing through slots 87, and is capable of being adjusted by means of a screw, 88, which passes through suitable nuts on both frames. Journaled on the frame 85 is a cross-shaft, 89, having a vertical revoluble cutter, 90, and a sprocket-wheel, 91. A chain, 92, extends from the sprocket-wheel 82 to the sprocket-wheel 91, and a chain, 93, extends from the sprocket-wheel 77 to the sprocket-wheel 78, so that the cutter 90 is driven by means of the power connections just described from the shaft 18.

Thus constructed the operation of our machine is as follows: It is placed in position in front of the breast of coal with its traveling carriage 9 and cutter-frame drawn back as far as possible, as shown in Fig. 1. The engines are started, causing the shafts 15 and 18 to revolve. The gearing connection between the latter and the shafts 20 and 23 causes the said shafts to turn, and by means of the sprocket-wheels 68 and 69 the cutter-chains 70 and 71 are caused to move in opposite directions around their respective sprocket-wheels 62, 59, and 60. The shaft 18, by means of its sprocket-wheel 77, also causes the rotation of the revoluble cutter 90 and by means of gear-wheel 29 it causes the gear-wheel 34 to revolve on the tube 30. The worm-gear 41 on the tube 30 is caused to turn, in an opposite direction by the worm-wheel 43 on the shaft 15. So long as the clutch 36 keeps the position shown in Fig. 3, out of connection with either clutch 35 or 42, the screw-shaft 7 remains stationary. In order to give a feeding or forward motion to the carriage 9 and its cutter-frame, the clutch 36 is moved along the tube 30 until it engages with the clutch 42 on the worm-gear 41, when it will be caused to rotate with the latter, and by reason of the feather 37 entering the spline 8 in the screw-shaft 7, the latter will be caused to turn with it. The nut 19 being in an engaging position, as shown in Fig. 3, the revolution of the screw 7 causes the carriage 9 to be moved forward toward the breast of rock. In this movement of the carriage all the operative parts—such as the engine, crank and other shafts—and all the operative mechanism of the machine, except the screw-shaft 7, are carried along with it, the tube 30 slipping loosely over the screw-shaft, and the feather 37 moving freely in the keyway 8. The chains 70 and 71, being driven by the sprocket-wheels 68 69, are guided in their movements by the said sprocket-wheels 62 63, and around the corners of the moving frame by the sprocket-wheels 59 60. They are held, as stated, up to their work and kept from jamming or kinking by the guide-plates 66 and 67. The cutters moving in opposite directions against the face of the rock counterbalance each other, so that the strain on the machine is equalized, and the amount of bracing necessary to hold it up to its work is reduced to a minimum. The material cut from the face of the rock is swept out of the kerf by the movement of the cutters, the lower chain necessarily doing the greater part of this work, owing to the fact that the dust and cuttings fall to the bottom of the kerf.

In order to keep the machine from being moved laterally, by reason of one of the chains working against harder material than the other, or from any other cause, we have provided the vertical cutter 90, which is of a diameter somewhat in excess of the height of the kerf cut by the horizontal chain-cutters, so as to make a guiding groove or crease in the bottom or top, or both in the bottom and top of the kerf. The cutter, being in this vertical crease or groove, will prevent the machine from moving laterally. When it is desired to reverse the machine, so as to retract the cutter-frame, the sliding clutch 36 is shifted from the clutch 42 into engagement with the clutch 35, when the wheel 34, running in the opposite direction, will turn the clutch with it, and cause the carriage to be moved backward over the screw. The advance or retraction of the carriage and its parts can be stopped at any point without disconnecting the clutch, by raising the nut 19 out of contact with the screw by means of the lever 47.

Our improved machine is relatively very light and strong, is capable of cutting very hard material, is very rapid in operation, operates with a comparatively small amount of power, is evenly balanced, so that there is but little back strain, and is durable and easily operated and kept in repair.

What we claim as our invention, and desire to secure by Letters Patent, is—

1. In a coal-mining machine, the combination of a sliding carriage carrying cutters for cutting the coal, a rotary screw-shaft, a nut situate on said carriage and gearing with the screw-shaft for moving the carriage, reversely-moving gear-wheels sliding loosely over the screw-shaft and revoluble thereon in opposite directions, and a sliding clutch mounted on the screw-shaft capable of engaging with either of said gear-wheels, substantially as and for the purposes described.

2. The combination of the screw-shaft with the sliding carriage, a nut mounted on said carriage and capable of engaging with the screw-shaft, a sliding tube mounted on the screw and connected with the carriage, gear-wheels mounted on said hollow shaft and turning loosely in opposite directions, and a clutch arranged between said wheels, having a feather-and-spline connection with the screw-shaft and capable of engaging with either of the said reversely-moving wheels, substantially as and for the purposes described.

3. In a coal-mining machine having a sliding carriage and cutter-chains revolving in opposite directions, the combination, with the said cutter-chains, of a vertical driving-shaft provided with a sprocket chain-wheel, a hollow shaft stepped on the first-named shaft and provided with a sprocket chain-wheel, said shafts being provided with separate gearing-connections and revoluble in opposite directions for moving the cutter-chains, substantially as and for the purposes described.

4. In a coal-mining machine, the combination of a series of laterally-operating cutters arranged to move and cut at the front of the machine and a driven vertical cutter arranged at the front of the machine to move and cut a kerf transversely to the kerf of the laterally-operating cutters, for the purpose of preventing lateral displacement of the machine, substantially as described.

5. In a coal-mining machine, the combination of a driving-shaft, 18, sprocket-wheels 77 and 78 driven thereby, a chain connecting the sprocket-wheels 77 and 78, a sprocket-wheel, 82, geared with the wheel 78, a vertical cutter, 90, mounted on a rotary shaft, and provided with a sprocket-wheel, 91, and a chain, 92, connecting the sprocket-wheels 82 and 91, substantially as and for the purposes described.

6. In a coal-mining machine, the combination of a traveling frame or carriage bearing cutters and a cutter, 90, arranged so as to be rotary in a plane transverse to the first-named cutters, and mounted on said frame or carriage on bearings which are movable and adjustable longitudinally relatively to the line of motion of the traveling frame or carriage, substantially as and for the purposes described.

7. In a coal-mining machine having a sliding frame, the combination of a cutter-chain moving across the front end of the machine and flanged guideways within which the cutter-chain moves, whereby it is prevented from rising or buckling in its passage, substantially as and for the purposes described.

8. In a coal-mining machine, the combination of a traveling frame or carriage bearing moving cutters, a rotary screw-shaft, a non-revoluble nut fixed on the carriage and engaging with the shaft, and an engine mounted on the carriage and geared with the screw-shaft, for the purpose of rotating said shaft, and thus advancing or retracting the carriage, substantially as described.

In testimony whereof we have hereunto set our hands this 4th day of May, A. D. 1885.

VAN AMBURG LECHNER.
SAMUEL C. LECHNER.

Witnesses:
J. A. KIGHT,
ALEX. M. Z. COTTON.